(12) United States Patent
Finn

(10) Patent No.: US 12,744,611 B2
(45) Date of Patent: Sep. 22, 2026

(54) INPUT SYNCHRONIZATION FOR CYCLIC QUEUEING AND FORWARDING (CQF)

(71) Applicant: Huawei Technologies Co., Ltd., Shenzhen (CN)

(72) Inventor: Norman William Finn, Spring Valley, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/596,163

(22) Filed: Mar. 5, 2024

(65) Prior Publication Data

US 2024/0214100 A1 Jun. 27, 2024

Related U.S. Application Data

(63) Continuation of application No. PCT/US2022/042777, filed on Sep. 7, 2022.

(60) Provisional application No. 63/241,937, filed on Sep. 8, 2021.

(51) Int. Cl.
*H04J 3/06* (2006.01)
*H04L 7/02* (2006.01)

(52) U.S. Cl.
CPC .............. *H04J 3/0673* (2013.01); *H04L 7/02* (2013.01)

(58) Field of Classification Search
CPC ...... H04J 3/0673; H04J 3/0664; H04J 3/0661; H04L 7/02; H04L 12/10; H04L 12/12; H04L 47/28; H04L 47/50; H04L 47/568; H04W 28/0268
See application file for complete search history.

(56) References Cited

U.S. PATENT DOCUMENTS 11,018,791 B2 * 5/2021 Götz ..................... H04J 3/0697
11,706,149 B2 * 7/2023 Geng ..................... H04L 47/28 370/235
2010/0110942 A1 * 5/2010 Cai ..................... H04B 7/2606 370/279
2020/0213022 A1 * 7/2020 Götz ..................... H04J 3/0697
(Continued)

FOREIGN PATENT DOCUMENTS

EP 4030646 A1 7/2022
WO 2021063191 A1 4/2021
WO 2021170343 A1 9/2021

OTHER PUBLICATIONS

Finn, N., "Input Synchronization for Cyclic Queueing and Forwarding," https://www.ieee802.org/1/files/public/docs2021/new-finn-CQF-sync-method-1121-v1.pdf, Sep. 18, 2021, 43 Pages.
(Continued)

*Primary Examiner* — Abdullahi E Salad
(74) *Attorney, Agent, or Firm* — Slater Matsil, LLP

(57) ABSTRACT

According to embodiments, a first device transmits a timing marker frame (TMF) in a first transmission cycle. The first device determines a transmission time of the TMF. The first device determines a time difference between the transmission time of the TMF and a start time of a second transmission cycle. The first device transmits to a second device a phase offset message (POM) indicating the time difference. The first device transmits frames in a transmission cycle subsequent to the first transmission cycle.

20 Claims, 10 Drawing Sheets

(56) References Cited

U.S. PATENT DOCUMENTS

2022/0224653 A1* 7/2022 Chen .................... H04L 47/56
2023/0090803 A1* 3/2023 Albrecht ................ H04L 12/40
370/235

OTHER PUBLICATIONS

Finn, N., "Towards a PAR (or PARs) for Pulsed Queues," Aug. 24, 2021, 29 Pages.
Finn, N., "Multiple Cyclie Queuing and Forwarding," Nov. 11, 2019, 14 Pages.
IEEE, "IEEE Standard for Local and Metropolitan Area Networks—Bridges and Bridged Networks," IEEE Computer Society, IEEE Std 802.1Q—2018, (Revision of IEEE Std 802.1Q-2014), Jul. 6, 2018, 1993 Pages.
IEEE, "IEEE Standard for Ethernet," IEEE Computer Society, IEEE Std 802.3—2018, (Revision of IEEE Std 802.3-2015), Aug. 31, 2018, 63 Pages.
MYPROJECT, "P802.1Qdv," https://development.standards.ieee.org/myproject-web/public/view.html#pardetail/10027, date obtained Sep. 26, 2022, 3 Pages.

* cited by examiner

INPUT SYNCHRONIZATION FOR CYCLIC QUEUEING AND FORWARDING (CQF)

CROSS-REFERENCE TO RELATED APPLICATIONS

This patent application is a continuation of International Patent Application No. PCT/US2022/042777, filed on Sep. 7, 2022, and entitled "Input Synchronization for Cyclic Queueing and Forwarding," which claims priority to U.S. Provisional Application No. 63/241,937, filed on Sep. 8, 2021, and entitled "Input Synchronization for Cyclic Queueing and Forwarding," applications of which are incorporated by reference herein as if reproduced in their entireties.

TECHNICAL FIELD

The present disclosure relates generally to network communications, and, in particular embodiments, to methods and apparatus for input synchronization for cyclic queueing and forwarding (CQF).

BACKGROUND

Cyclic queueing and forwarding (CQF), as defined in Annex T of IEEE Std 802.1Q-2018, is a scheduling technique for time-critical packets. CQF uses double buffering to allow bridges in a bridged network to synchronize transmission (frame enqueue/dequeue operations) in a cyclic manner, with bounded latency depending only on the number of hops and the cycle time, completely independent of the network topology.

SUMMARY

In order to assign received packets to the right queue or bin, the receiving network node may need to establish a receiving cycle start time, so that packets received during a receive cycle starting at that receiving cycle start time, or at that time plus or minus an integer multiple of the cycle time, are packets that were all transmitted during the same transmission cycle by the transmitting network node.

According to embodiments, a first device transmits to a second device a timing marker frame (TMF) in a first transmission cycle. The first device determines a transmission time of the TMF. The first device determines a time difference between the transmission time of the TMF and a start time of a second transmission cycle. The first device transmits to the second device a phase offset message (POM) indicating the time difference. The first device transmits to the second device frames in a transmission cycle subsequent to the first transmission cycle.

In some embodiments, the TMF may indicate a TMF identifier (TMFID) that uniquely identifies the TMF. The POM may indicates the TMFID.

In some embodiments, the transmission time of the TMF may be a local time at which a first bit of the TMF is transmitted from a hardware of the first device.

In some embodiments, the time difference may be the transmission time of the TMF minus the start time of the second transmission cycle.

In some embodiments, the second transmission cycle may be the same as the first transmission cycle, or the second transmission cycle may be after the first transmission cycle, or the second transmission cycle may be before the first transmission cycle.

In some embodiments, a transmission cycle length on the first device and a receive cycle length on the second device may be the same.

In some embodiments, all the frames transmitted by the first device in a transmission cycle subsequent to the first transmission cycle may be received by the second device in a same receive cycle without time synchronization between the first device and the second device.

In some embodiments, the TMF is not a first frame in time in the first transmission cycle transmitted by the first device.

In some embodiments, the first device may transmit M TMFs in N transmission cycles with M being less than N.

According to embodiments, a second device receives a timing marker frame (TMF) in a first receive cycle. The second device receives from the first device a phase offset message (POM) indicating a time difference. The second device determines a receive time of the TMF. The second device determines a start time of a second receive cycle based on the receive time of the TMF and the time difference indicated in the POM. The second device receives from the first device frames in a receive cycle subsequent to the first receive cycle based on the start time of the second receive cycle.

In some embodiments, the TMF may indicate a TMF identifier (TMFID) that uniquely identifies the TMF. The POM may indicate the TMFID.

In some embodiments, the receive time of the TMF may be a local time at which a first bit of the TMF is received by a hardware of the second device.

In some embodiments, the time difference may be the receive time of the TMF minus the start time of the second receive cycle.

In some embodiments, the second receive cycle may be the same as the first receive cycle, or the second receive cycle may be after the first receive cycle, or the second receive cycle may be before the first receive cycle.

In some embodiments, all the frames transmitted by the first device in a transmission cycle subsequent to transmission of the TMF may be received by the second device in a same receive cycle without time synchronization between the first device and the second device.

In some embodiments, the TMF is not a first frame in time in the first receive cycle received by the second device.

In some embodiments, he second device may receive M TMFs in N receive cycles, and wherein M is less than N.

In so doing, embodiment techniques in this disclosure provide technical solutions for improving the flexibility, performance, and efficiency of network communications over the current solution.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
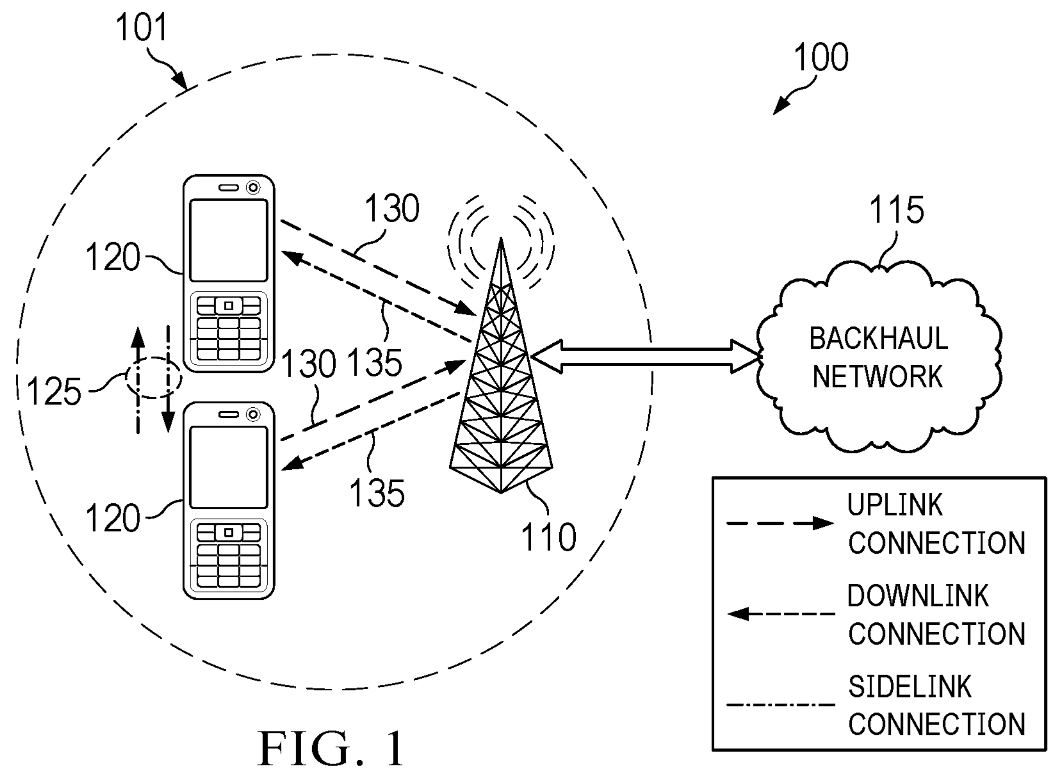
FIG. 1 illustrates a diagram of an embodiment wireless communications network.

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

As defined in Annex T of IEEE Std 802.1Q, all of the bridges in a bridged network (as defined by IEEE Std 802.1Q) can be configured to offer a special service to a particular class of data streams ("CQF streams"). Packets belonging to the CQF streams make use of a pair of buffers allocated at each output port of each bridge in the network. These buffers are used as a pair. At any given moment in time, one of the buffers is in the filling state, meaning that packets belonging to the CQF streams that are to be output on its port are deposited in that buffer. At that same moment, the other buffer is in the emptying state, meaning that packets from that buffer are offered for transmission on the port, and are output at a high priority, compared to other non-CQF-stream packets. Every output port on every bridge that can carry CQF streams has a similar pair of buffers. The roles of these two buffers are interchanged (e.g., a buffer swap may take place) at regular time intervals, defined by configuration. Such time interval may called the "cycle time."

As defined in Annex T of IEEE Std 802.1Q, all of the bridges in the network use the same value for the cycle time. Furthermore, the bridges use some means (e.g., IEEE Std 802.1AS) to synchronize their clocks, so that all of the ports on all of the bridges in the network perform their buffer swap at the same time, within some specified tolerance that is less than the cycle time. In a typical implementation of CQF, each bridge has a clock function that uses some means to synchronize itself with the other bridges' clock functions, and that clock function drives the buffer swapping mechanism.

Any given packet takes a finite amount of time to be transmitted from the buffer onto the medium connecting the bridges (transmission delay), some time to traverse the length of the medium (link delay), some time to be received at the receiving end (reception delay), and some time to be forwarded to the selected output buffer. Thus, the transmitting bridge must cease transmission for some time before the end of the cycle time, in order to leave time for the last-transmitted packet to reach the output buffer at the next hop before the end of the cycle time. Such unusable time at the end of a cycle may be referred to as the "dead time."

Given the "dead time" scenario, each packet in a CQF stream makes one bridge-to-bridge hop per cycle time. At the start of a cycle time, the formerly-filling buffer becomes the emptying buffer. Each packet transmitted from the now-emptying buffer travels from its output buffer in that bridge, across the connecting medium, and into the one adjacent receiving bridge, and then to the filling buffer of an output port on that receiving bridge. All CQF stream packets reach the appropriate filling buffer before the end of the cycle. When the current cycle time expires, the filling buffer becomes the emptying buffer starting at the next cycle time, and the process repeats. A network may employ protocols and/or configuration methods that ensure that the total amount of CQF stream data passing through any output port does not exceed the amount that can be physically transmitted during one cycle time less the required dead time. If the link between the two bridges is long enough and the cycle time is short enough, the link delay can cause the dead time to exceed the cycle time, in which case CQF may not be used.

Alternatively, network nodes in a network running CQF can place time-critical packets into a queue that is split into bins, the bins being enabled for output at regular intervals (e.g., cycle times). One bin in the queue is enabled for output at any one moment, and the other bins are able to receive data. Multiple queues can be active on the same output port, and they can use the same or different cycle times.

In either case (multiple queues, or single queues with multiple bins), if packets in a transmission node (e.g., node n) are transmitted from a single output port during a sing cycle time, and they are to be transmitted from the same output port in the next network node (e.g., node n+1), the packets have to be transmitted in the same cycle time from the next network node (e.g., node n+1). Packets transmitted in different cycle times from the transmission node (e.g., node n) must not be transmitted in the same cycle time in the next network node (e.g., node n+1). The current solution for CQF transmissions uses time synchronization among all network devices (e.g., bridges) to ensure the "same bin" need. A new technical solution is desired to improve the flexibility, performance, and efficiency of network communications.

FIG. 1 is a diagram of an embodiment communications system 100. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node 110 typically allocates resources used by the UE to communicate when specific conditions are met. Communication between a UE pair in the second operating mode occurs over sidelinks 125, comprising uni-directional communication links. Communication in the second operating mode may be referred to as sidelink communication. Communication between a UE and access node pair also occur over uni-directional communication links, where the communication links from UEs 120 to the access node 110 are referred to as uplinks 130, and the communication links from the access node 110 to the UEs 120 are referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on. UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

Network nodes in a network running CQF (e.g., CQF network) place time-critical packets into queues split into bins, that are enabled for output at regular intervals (e.g., cycle times). Each bin corresponds to a different cycle time. All queues in the CQF network at a given QoS class operate at the same frequency (e.g., the same cycle time duration), so that packets can be assigned to an output bin based on arrival time, and no bin overflows.

Every device in a CQF network transmits frames in cyclic windows of time (e.g., cycle times). If two frames are assigned to the same window (e.g., cycle time) in one transmission port, and two frames both are to be transmitted from the same port at the next hop, the two frames must be transmitted in the same window (e.g., cycle time) at that next hop. That means, the two frames cannot be separated into different windows (e.g., cycle time). So, packets in the same bin corresponding to the same cycle time in a transmission node (e.g. node n) need to be placed in same bin in the receiving node (e.g., node n+1).

Figure 2A:
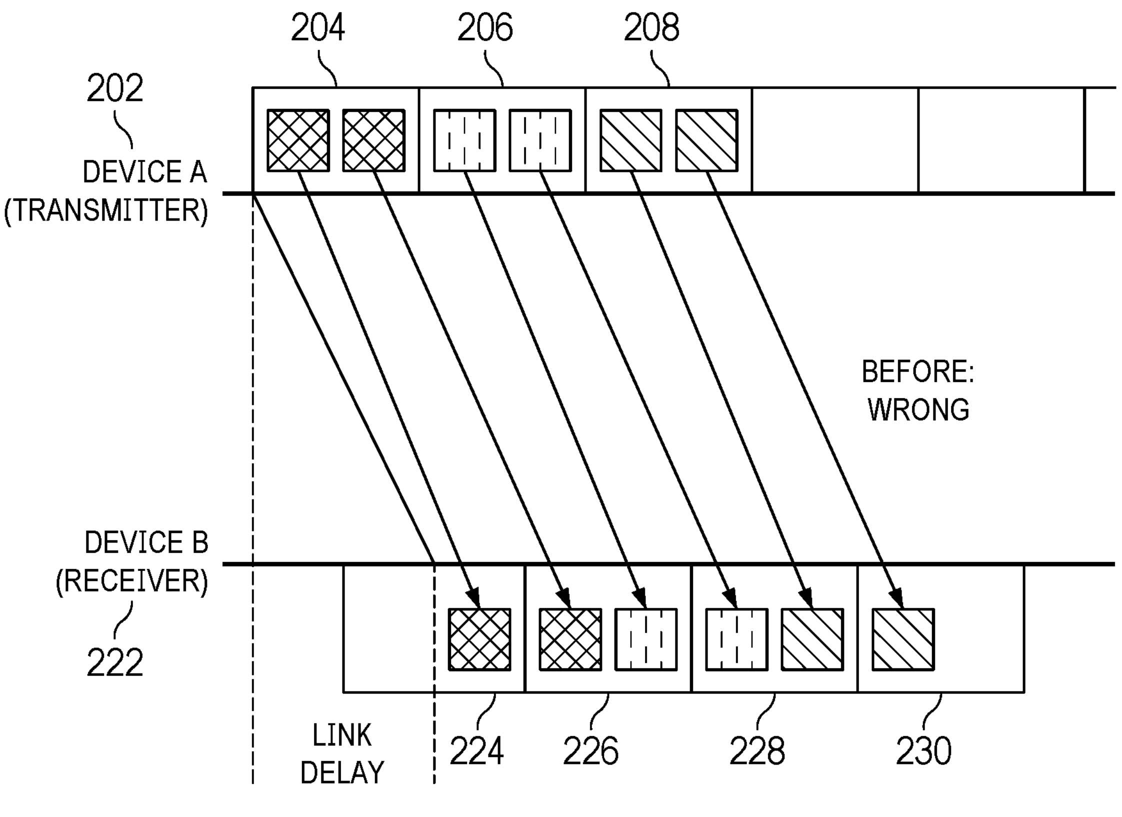
FIG. 2A illustrates the technical problem of alignment issue caused by link delays.

CQF uses arrival time, rather than frame contents, to put frames in bins. Long links introduce long, asymmetrical delays that make it hard to align bin phase from hop to hop. FIG. 2A illustrates the technical problem of alignment issue caused by link delays. In FIG. 2A, device A 202 (e.g., a transmitter bridge) transmits packets in cycle times 204, 206, and 208. There are two packets in each cycle time shown in FIG. 2A purely for illustration purpose. Device A 202 can transmit more or less than two packets in each cycle time. To satisfy the requirements of CQF transmission, packets transmitted in cycle time 204 need to be received in the same cycle time at device B 222 (e.g., a receiver bridge), packets transmitted in cycle time 206 need to be received in another same cycle time at device B 222, and packets transmitted in cycle time 208 need to be received in yet another same cycle time at device B 222. Furthermore, in one cycle time at device B 222, device B 222 cannot receive two packets transmitted in two different cycle times at device A 202. However, because of the link delay, packets transmitted in cycle time 204 are received in cycle times 224 and 226 at device B 222, packets transmitted in cycle time 206 are received in cycle times 226 and 228 at device B 222, packets transmitted in cycle time 208 are received in cycle times 228 and 230 at device B 222. This misalignment of cycle times is undesirable.

The current solution for CQF transmissions uses time synchronization among all network devices to address the misalignment issue above. So, in the current solution, it is assumed that the clocks that drive the rotation of the CQF transmission windows (e.g., cycle times) in every device in a CQF network are synchronized, in the sense that the phase offset between the window boundaries in two different devices is constant, to within a tolerance much smaller than the window size. The time synchronization among network devices may be achieved in several ways known in the art, such as using the precision time protocol (PTP) or using the synchronous Ethernet (SynchE). However, requiring time synchronization among all network devices is inflexible and impact performance and efficiency of network transmissions.

From the receiver's point of view, it is desirable that, if two CQF stream packets are transmitted from the same buffer during one cycle time of the transmitter, and if these two CQF stream packets are output from the same port at the next hop (e.g., the receiver), these two CQF stream packets are output from the same buffer during one cycle time on the next hop. In current systems, given that the packets are not marked with a "window ID" (e.g., the cycle time ID), the receiver has only the time of arrival in its own clock to use to determine to which buffer to place an incoming packet. That is, the receiver has to run a timer that runs at exactly the cycle time of the CQF network. The receiver assigns all of the packets received during one cycle time to the same output buffer (if the two CQF stream packets go to the same output port). If all bridges time synchronize the buffer swap events, there are no technical issues as all received packets go to the "filling" buffer. However, when the bridges in the CQF network are not all time synchronized (e.g., due to long links), the current systems can encounter the misalignment issue above.

In the case of a long link, a bridge may make good use of more than two CQF buffers on an output port. That is, there can be more than one filling and/or holding buffers, in addition to the one emptying buffer. When a CQF stream packet is received, it must be assigned to one or the other of the filling buffers on the port.

It is not necessary for all bridges to synchronize the buffer swap events, although it is required that they all operate using exactly the same cycle time. That is, while the time difference between buffer swap events in different bridges, or even between different ports in the same bridge, does not have to be zero, the difference between any two ports in the network needs to remain constant over the long term, within some finite tolerance.

Figure 2B:
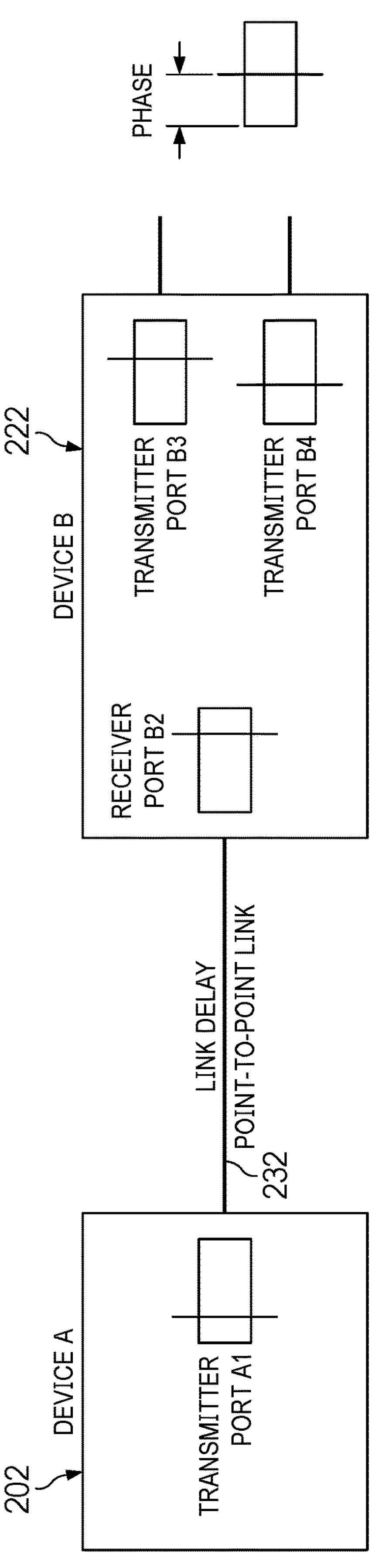
FIG. 2B illustrates a goal of solving the technical problem of alignment issue caused by link delays, according to some embodiments.

FIG. 2B illustrates a goal of solving the technical problem of alignment issue caused by link delays, according to some embodiments. In some embodiments, it may be assumed that the receiver port B2 of the device B 222 can measure the phase differences between the receiver port B2 and the transmission ports B3 and B4 of the device B 222 (by the nature of CQF, these ports run at the same window (e.g., cycle time)). The goal of solving the technical problem described above is for receiver port B2 of the device B 222 to determine the phase offset between the transmitter port A1 of the device A 202 and the receiver port B2 of the device B 222, and remove such phase offset. There is a link delay for the point-to-point link 232 from the transmitter port A1 of the device A 202 to the receiver port B2 of the device B 222, due to the finite speed of the link 232 across the medium, typically near the speed of light. In a long link (e.g., hundreds of kilometers), the link delay can be longer than the rotation cycle time (e.g., the transmission cycle time at the device A 202 or the receive cycle time at the device B 222). In some embodiments, it may be assumed that the link delay is constant, and in practice, the link delay is within very tight tolerances.

This disclosure provides technical solutions to the technical problem by synchronizing the receiver's cycle time to the transmitter's cycle time so that CQF stream packets transmitted during the same transmission cycle time of the transmitter would be received during the receive cycle time of the receiver, and CQF stream packets transmitted from different transmission cycle times of the transmitter would be received into different cycle times of the receiver. In other words, given that the transmitter and receiver operate at the same frequency over the long term, embodiments provide techniques for the receiver to adjust the phase of its receive cycle time to match the phase of the transmitter's transmission cycle time, offset by a time equal to the link delay, modulo the cycle time.

Figure 3:
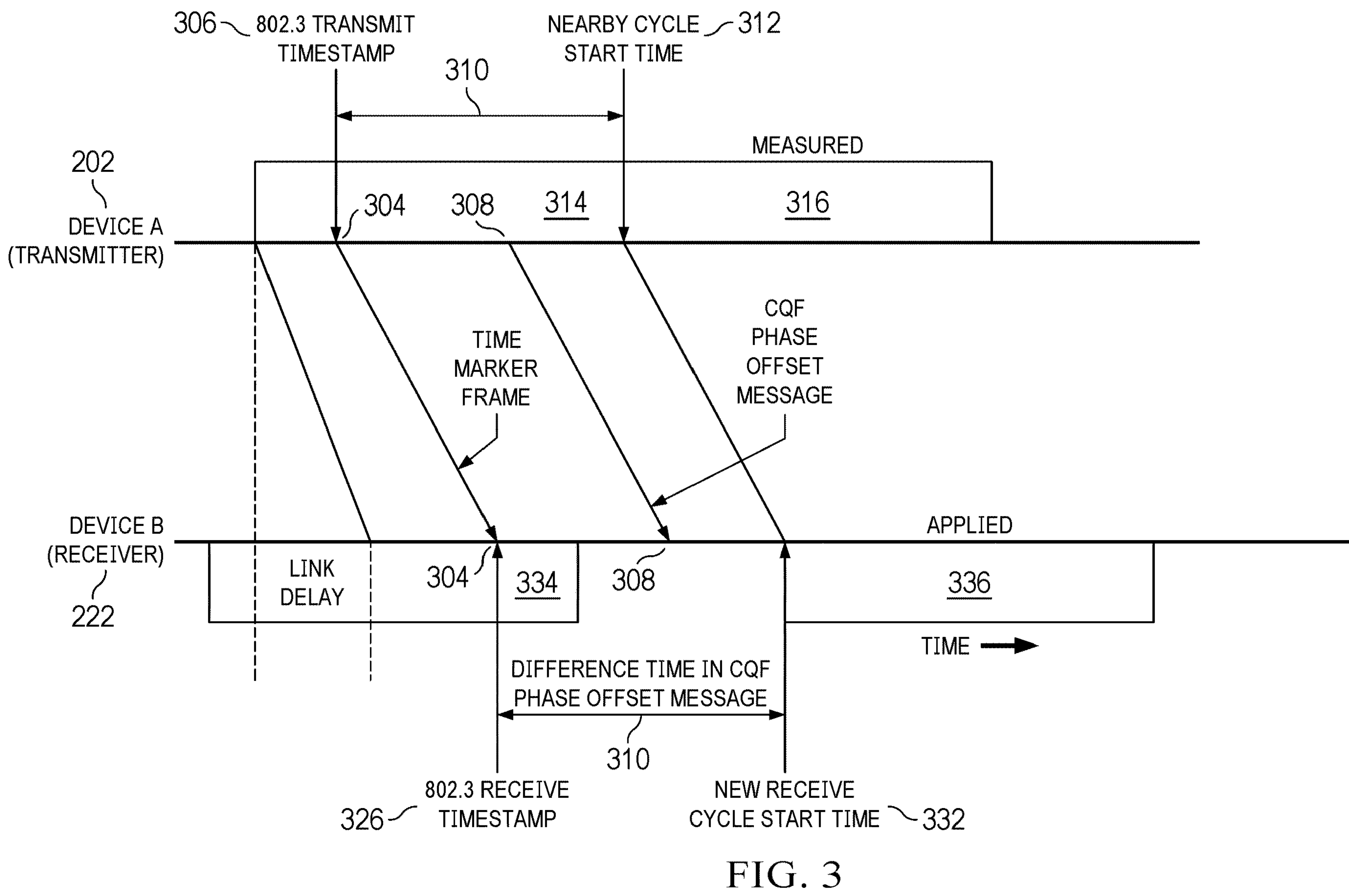
FIG. 3 illustrates a diagram of a technical solution to align bin phases using a protocol to determine the effective phase difference in bin timing, according to some embodiments.

FIG. 3 illustrates a diagram of a technical solution to align bin phases using a protocol to determine the effective phase difference in bin timing, according to some embodiments. In FIG. 3, device A 202 (e.g., a transmitter bridge) transmits a timing marker frame (TMF) 304 in the cycle time 314. The TMF 304 carries a TMF identifier (TMFID) that changes with each transmission. In other words, a TMFID carried in a TMF uniquely identifies that TMF. After transmitting the TMF 304, device A 202 recovers the transmit time stamp 306, which is the time at which the first bit of the frame was transmitted from the hardware of device A 202. IEEE Std 802.3 Clause 90 specifies a method for accomplishing recovering the transmit time stamp 306. IEEE Std 802.3 Clause 90 provides an "802.3 transmit time stamp," in terms of the local transmit clock of a port, that can be retrieved after a packet has been transmitted. This time stamp reports when the first bit of the packet was transmitted on the medium.

Device A 202 then transmits a CQF Phase Offset Message (POM) 308. The CQF POM 308 may carry: (a) the TMFID of the TMF 304, and (b) the time difference 310, in local time of device A 202, between the start time 312 of a recent (or soon to come) transmission cycle time 316 and the TMF transmit time stamp 306 determined by device A 202 ([the time difference 310]=[nearby cycle start time 312]−[transmit time stamp 306]). FIG. 3 shows that the recent (or soon to come) transmission cycle time (nearby transmission cycle time) 316, which starts at the start time 312 (e.g., buffer swap time), as the next adjacent cycle time following the cycle time 314 in which the TMF 304 is transmitted. This is for illustration purpose. The nearby transmission cycle time 316 may be the same cycle time as the cycle time 314 in which the TMF is transmitted. The nearby transmission cycle time 316 may also be any cycle time before or after the cycle time 314 in which the TMF is transmitted. So, the time different 310 may be a signed number.

On the receiving end, device B 222 (e.g., a receiver bridge) receives the TMF 304 in cycle time 334. Device B 222 records the time of arrival (e.g., receive time stamp 326) of the first bit of the TMF based on IEEE Std 802.3 clause 90 provides an "802.1 receive time stamp," in terms of the local receive clock of a port, that is reported along with each received packet. The receive time stamp 326 reports when the first bit of the packet is received on the medium by device B 222. Device B 222 may also record the TMFID of the TMF 304.

Device B 222 then receives the CQF POM 308, which carries the TMFID matching a recently-recorded TMF 304. The time of reception (e.g., receive time stamp 326) of the TMF 304, plus the (signed) time difference 310 carried in the CQF POM 308, is the local state time 332 of device B 222 at which the receive cycle time 336. The receive cycle time 336 corresponds to the nearby transmission cycle time 316 selected by the transmitter (e.g., device A 302) for reporting in the CQF POM. The new receive cycle start time 332 establishes the cycle start time (e.g., buffer swap time) for the receiver's input gates in local time of device B 322.

Figure 4:
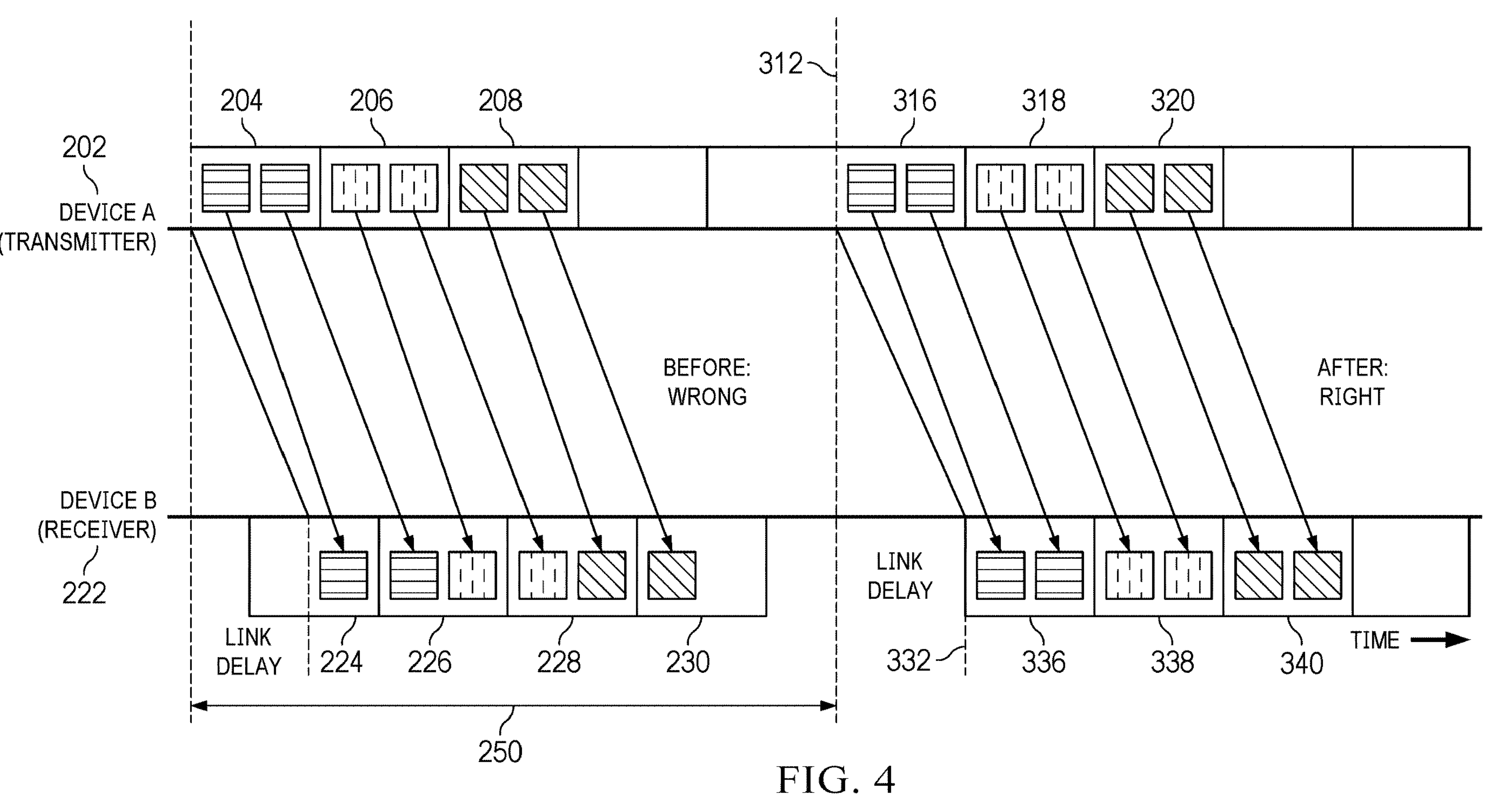
FIG. 4 illustrates the effect of applying the embodiment techniques of this disclosure.

FIG. 4 illustrates the effect of applying the embodiment techniques of this disclosure, such as the one illustrated in FIG. 3. Without time synchronization between device A 202 and device B 222, misalignment issue, such as described with respect to FIG. 2A, may occur during period 250. Using the techniques of communicating and processing the TMF and the CQF POM (not shown in FIG. 4), such as the one described with respect to FIG. 3, the proper start time 332 of the receive cycle time 336 is determined. Consequently, packets transmitted by device A 202 in the nearby transmission cycle time 316 (which starts at time 312) are all received by device B 222 in the receive cycle time 336. Similarly, packets transmitted by device A 202 in the transmission cycle time 318 are all received by device B 222 in the receive cycle time 338, packets transmitted by device A 202 in the transmission cycle time 320 are all received by device B 222 in the receive cycle time 340, and so on.

Figure 5A:
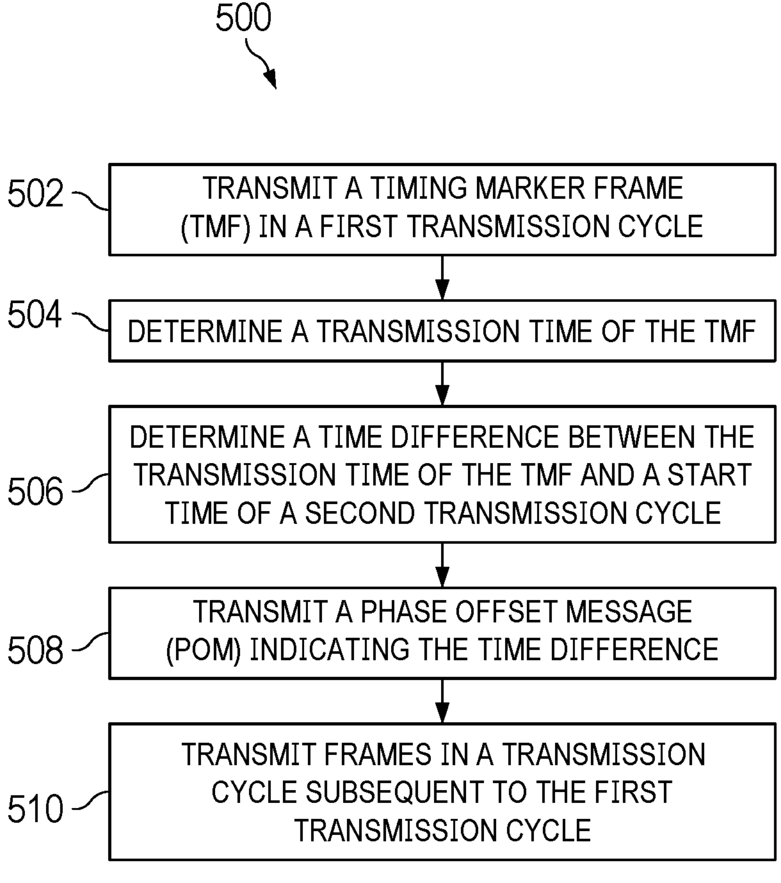
FIG. 5A illustrates a flow chart of a method 500 for input synchronization for CQF, according to some embodiments.

FIG. 5A illustrates a flow chart of a method 500 for input synchronization for CQF, according to some embodiments. The method 500 may be carried out or performed by a first device (e.g., transmitter device A 202). The method 500 may be carried out or performed by routines, subroutines, or modules of software executed by one or more processing units of the first device. The method 500 may further be carried out or performed by hardware, software, or a combination of hardware and software of the first device. Coding of the software for carrying out or performing the method 500 is well within the scope of a person of ordinary skill in the art having regard to the present disclosure. The method 500 may include additional or fewer operations than those shown and described and may be carried out or performed in a different order. Computer-readable code or instructions of the software executable by the one or more processing units may be stored on a non-transitory computer-readable medium, such as for example, the memory of the first device.

The method 500 starts at operation 502, where the first device transmits to a second device a timing marker frame (TMF) in a first transmission cycle. At operation 504, the first device determines a transmission time of the TMF. At operation 506, the first device determines a time difference between the transmission time of the TMF and a start time of a second transmission cycle. At operation 508, the first device transmits to the second device a phase offset message (POM) indicating the time difference. At operation 510, the first device transmits to the second device frames in a transmission cycle subsequent to the first transmission cycle.

In some embodiments, the TMF may indicate a TMF identifier (TMFID) that uniquely identifies the TMF. The POM may indicates the TMFID.

In some embodiments, the transmission time of the TMF may be a local time at which a first bit of the TMF is transmitted from a hardware of the first device.

In some embodiments, the time difference may be the transmission time of the TMF minus the start time of the second transmission cycle.

In some embodiments, the second transmission cycle may be the same as the first transmission cycle, or the second transmission cycle may be before or after the first transmission cycle, or the second transmission cycle may be before the first transmission cycle.

In some embodiments, a transmission cycle length on the first device and a receive cycle length on the second device may be the same.

In some embodiments, all the frames transmitted by the first device in a transmission cycle subsequent to the first transmission cycle may be received by the second device in a same receive cycle without time synchronization between the first device and the second device.

In some embodiments, the TMF is not a first frame in time in the first transmission cycle transmitted by the first device.

In some embodiments, the first device may transmit M TMFs in N transmission cycles with M being less than N.

Figure 5B:
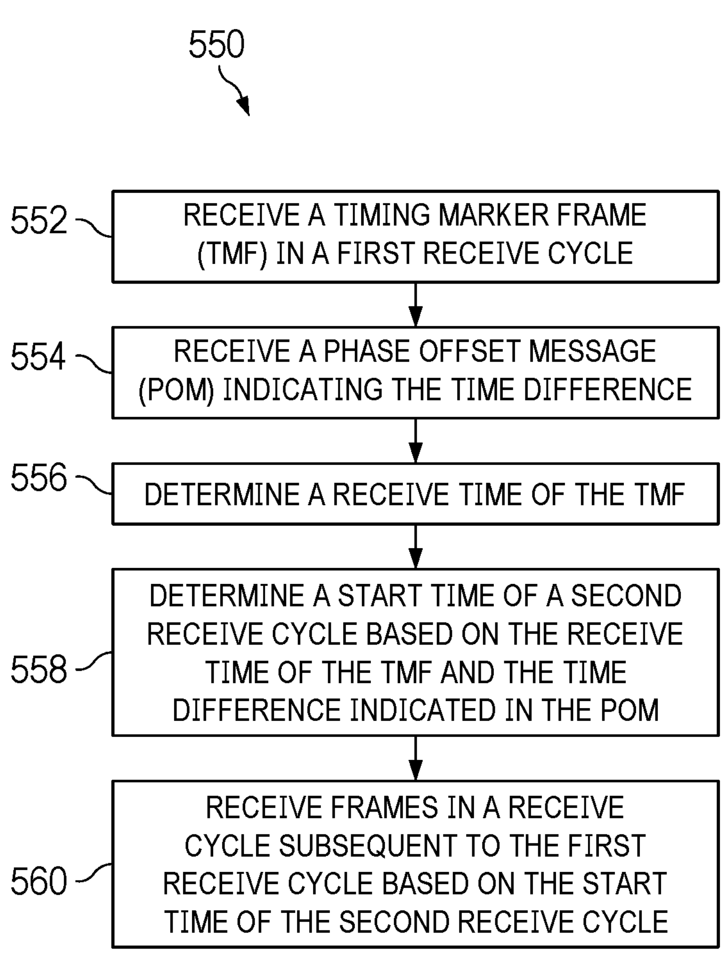
FIG. 5B illustrates a flow chart of a method 550 for input synchronization for CQF, according to some embodiments.

FIG. 5B illustrates a flow chart of a method 550 for input synchronization for CQF, according to some embodiments. The method 550 may be carried out or performed by a second device (e.g., receiver device B 222). The method 550 may be carried out or performed by routines, subroutines, or modules of software executed by one or more processing units of the second device. The method 550 may further be carried out or performed by hardware, software, or a combination of hardware and software of the second device. Coding of the software for carrying out or performing the method 550 is well within the scope of a person of ordinary skill in the art having regard to the present disclosure. The method 550 may include additional or fewer operations than those shown and described and may be carried out or performed in a different order. Computer-readable code or instructions of the software executable by the one or more processing units may be stored on a non-transitory computer-readable medium, such as for example, the memory of the second device.

The method 550 starts at operation 552, where the second device receives a timing marker frame (TMF) in a first receive cycle. At operation 554, the second device receives from the first device a phase offset message (POM) indicating a time difference. At operation 556, the second device determines a receive time of the TMF. At operation 558, the second device determines a start time of a second receive cycle based on the receive time of the TMF and the time difference indicated in the POM. At operation 560, the second device receives from the first device frames in a receive cycle subsequent to the first receive cycle based on the start time of the second receive cycle.

In some embodiments, the TMF may indicate a TMF identifier (TMFID) that uniquely identifies the TMF. The POM may indicate the TMFID.

In some embodiments, the receive time of the TMF may be a local time at which a first bit of the TMF is received by a hardware of the second device.

In some embodiments, the time difference may be the receive time of the TMF minus the start time of the second receive cycle.

In some embodiments, the second receive cycle may be the same as the first receive cycle, or the second receive cycle may be after the first receive cycle, or the second receive cycle may be before the first receive cycle.

In some embodiments, all the frames transmitted by the first device in a transmission cycle subsequent to transmission of the TMF may be received by the second device in a same receive cycle without time synchronization between the first device and the second device.

In some embodiments, the TMF is not a first frame in time in the first receive cycle received by the second device.

In some embodiments, he second device may receive M TMFs in N receive cycles, and wherein M is less than N.

According to embodiments, given the constant, cyclic nature of the windows (e.g., cycle times), the receiver can assign received frames to the right window. In multi-CQF, where many nested window cycle times are used on one port, the time chosen for the phase offset message (POM) may be the start of the largest cycle on the port. It is not necessary to determine the actual time of flight of the timing marker frame (TMF), and such actual time of flight may be irrelevant to the embodiments of this disclosure. The desirable matter is zeroing the phase difference between the transmitter's window (e.g., transmission cycle time) and the receiver's window (e.g., receive cycle time).

In some embodiments, the receiver knows the phase from the first TMF and POM pair. If the transmitter sends further periodic TMFs and POMs, the receiver may track the accuracy of its phase determination, which allows the receiver to take appropriate action. The appropriate action may be raising an alarm or demoting the multi-CQF traffic to best-effort priority, if the phase drifts excessively. The appropriate action may also be adjusting the phase, if the phase drifts slowly (e.g. due of diurnal temperature changes in a long optical fiber).

In some embodiments, the TMF may be of a new protocol (a new EtherType), or an existing suitable frame, such as one used by the Precision Time Protocol (PTP, IEEE Std 1588, IEEE Std 802.1AS, or others), or by Connectivity Fault Management (CFM, IEEE Std 802.1Q clauses 18-22).

In some embodiments, the POM may be a new protocol (a new EtherType), or the information of the POM may be added as an additional information element in an existing timing protocol such as PTP or CFM.

In some embodiments, a network node may employ more than one CQF queue, each running at a different cycle time, each at a different level of priority, and each queue's cycle time an integer multiple of the next-faster queue's cycle time. An embodiment may therefore use a single TMF/POM pair to align the slowest cycle time used on the output port, and this embodiment may serve to align the faster cycles, as well.

In some embodiments, an Ethernet frame (which may be small) may carry other useful CQF parameters in the POM, including one or more of the priority value for each level of CQF, the integral cycle time multiplier from each priority value to the next, the cycle time of the slowest cycle as a rational number of nanoseconds (as used in IEEE Std 802.1Q-2018 clause 8.6.9.4.3 for scheduled transmissions), or the maximum number of bit times that the transmitter is allowed, by configuration or by implementation details, to allocate to one window at each priority level.

In some embodiments, if bridges have synchronized their clocks (using, e.g., IEEE Std 1588 or IEEE Std 802.1AC), a transmitter in a bridge may send a message indicating to a receiver in another bridge the absolute time of a recent buffer swap (e.g., start of a cycle time) event. The clock synchronization methods mentioned (e.g., IEEE Std 1588 or IEEE Std 802.1AC) may also measure the two-way link delay of each link. The receiver may add the measured link delay computed by the synchronization protocol to the time provided by the transmitter to compute the absolute time of the start of the cycle time.

In theory, similar results may be achieved by running PTP as a time synchronization protocol and sending a message indicating the phase of the transmitter window relative to PTP time. However, the PTP time, and hence the derived receive window timing, is subject to errors caused by asymmetrical link delays (links that do not have the same delay in both directions), which are a problem with long links. In contrast, the embodiment techniques of this disclosure do not require that the link delay be symmetrical. This means that the inevitable asymmetries in long links do not degrade the ability of the receiver to properly assign frames to the right window (e.g., receive cycle time) because the embodiment techniques do not care about the actual value of the link delay. Instead, the embodiment techniques care about the phase difference between the transmitter and receiver windows (e.g., the phase difference between the transmission cycle time at the transmitter and the receive cycle time at the receiver). So, the embodiment techniques do not require synchronization protocols such as the PTP.

The embodiment techniques work with SynchE, whether or not the nodes use follow-on steps for time synchronization. Accordingly, embodiment techniques of this disclosure improve the flexibility, performance, and efficiency of network communications.

Figure 6:
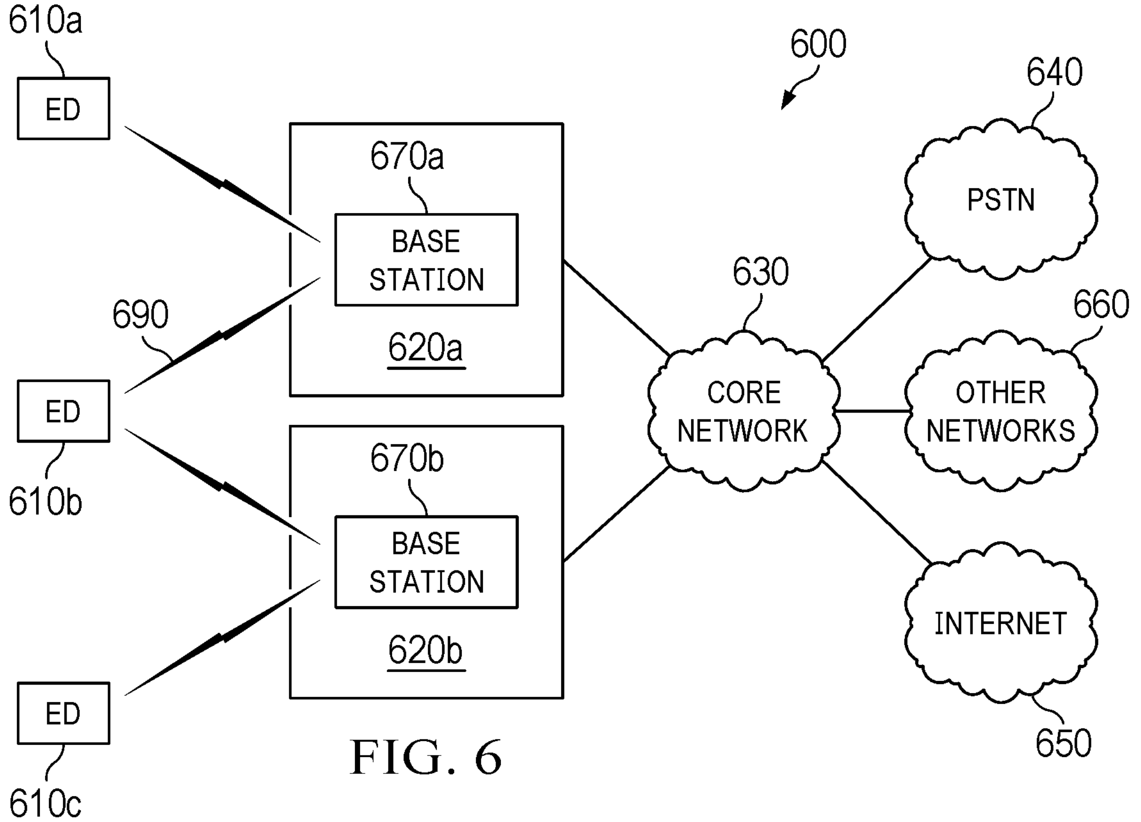
FIG. 6 is a diagram of another embodiment communication system.

FIG. 6 is a diagram of an example communication system 600. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 600 includes electronic devices (ED) 610*a*-610*c*, radio access networks (RANs) 620*a*-620*b*, a core network 630, a public switched telephone network (PSTN) 640, the Internet 650, and other networks 660. While certain numbers of these components or elements are shown in FIG. 6, any number of these components or elements may be included in the system 600.

The EDs 610*a*-610*c* are configured to operate or communicate in the system 600. For example, the EDs 610*a*-610*c* are configured to transmit or receive via wireless or wired communication channels. Each ED 610*a*-610*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 620*a*-620*b* here include base stations 670*a*-670*b*, respectively. Each base station 670*a*-670*b* is configured to wirelessly interface with one or more of the EDs 610*a*-610*c* to enable access to the core network 630, the PSTN 640, the Internet 650, or the other networks 660. For example, the base stations 670*a*-670*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 610*a*-610*c* are configured to interface and communicate with the Internet 650 and may access the core network 630, the PSTN 640, or the other networks 660.

In the embodiment shown in FIG. 6, the base station 670*a* forms part of the RAN 620*a*, which may include other base stations, elements, or devices. Also, the base station 670*b* forms part of the RAN 620*b*, which may include other base stations, elements, or devices. Each base station 670*a*-670*b* operates to transmit or receive wireless signals within a particular geographic region or area, sometimes referred to as a "cell." In some embodiments, multiple-input multiple-output (MIMO) technology may be employed having multiple transceivers for each cell.

The base stations 670*a*-670*b* communicate with one or more of the EDs 610*a*-610*c* over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 620*a*-620*b* are in communication with the core network 630 to provide the EDs 610*a*-610*c* with voice, data, application, Voice over Internet Protocol (VoIP), or other services. Understandably, the RANs 620*a*-620*b* or the core network 630 may be in direct or indirect communication with one or more other RANs (not shown). The core network 630 may also serve as a gateway access for other networks (such as the PSTN 640, the Internet 650, and the other networks 660). In addition, some or all of the EDs 610*a*-610*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

Figure 7A:
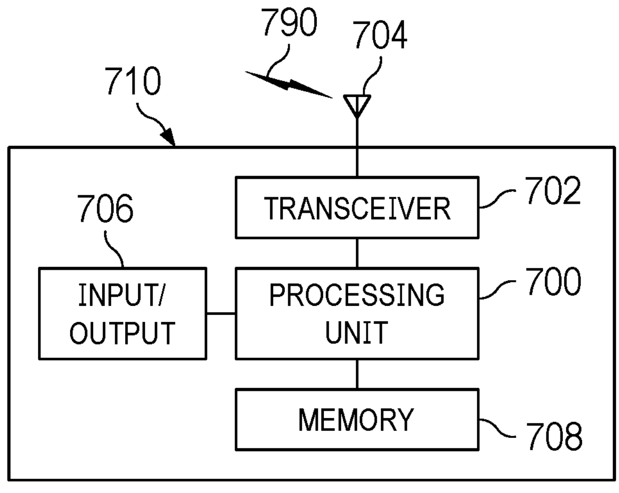
FIG. 7A is a diagram of an embodiment end device (ED)
Figure 7B:
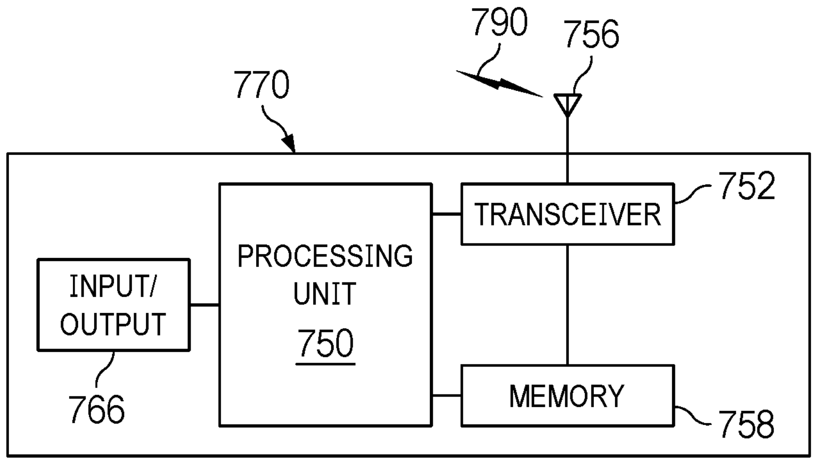
FIG. 7B is a diagram of an embodiment base station.

FIGS. 7A and 7B illustrate example devices that may implement the methods and teachings according to this disclosure. In particular, FIG. 7A illustrates an example end device (ED) or a terminal device 710, and FIG. 7B illustrates an example base station 770. These components could be used in the system 600 or in any other suitable system.

As shown in FIG. 7A, the ED 710 includes at least one processing unit 700. The processing unit 700 implements various processing operations of the ED 710. For example, the processing unit 700 could perform signal coding, data processing, power control, input/output processing, or any other functionality enabling the ED 710 to operate in the system 600. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 710 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission or processing signals received wirelessly or by wire. Each antenna 704 includes any suitable structure for transmitting or receiving wireless or wired signals 790. One or multiple transceivers 702 could be used in the ED 710, and one or multiple antennas 704 could be used in the ED 710. Although shown as a single functional unit, a transceiver 702 could also be implemented using at least one transmitter and at least one separate receiver.

The ED 710 further includes one or more input/output devices 706 or interfaces (such as a wired interface to the Internet 650). The input/output devices 706 facilitate interaction with a user or other devices (network communications) in the network. Each input/output device 706 includes any suitable structure for providing information to or receiving information from a user, such as a speaker, microphone, keypad, keyboard, display, or touch screen, including network interface communications.

In addition, the ED 710 includes at least one memory 708. The memory 708 stores instructions and data used, generated, or collected by the ED 710. For example, the memory

708 could store software or firmware instructions executed by the processing unit(s) 700 and data used to implement the embodiment methods. Each memory 708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 770 includes at least one processing unit 750, at least one transceiver 752, which includes functionality for a transmitter and a receiver, one or more antennas 756, at least one memory 758, and one or more input/output devices or interfaces 766. A scheduler, which would be understood by one skilled in the art, is coupled to the processing unit 750. The scheduler could be included within or operated separately from the base station 770. The processing unit 750 implements various processing operations of the base station 770, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more EDs or other devices. Each transceiver 752 further includes any suitable structure for processing signals received wirelessly or by wire from one or more EDs or other devices. Although shown combined as a transceiver 752, a transmitter and a receiver could be separate components. Each antenna 756 includes any suitable structure for transmitting or receiving wireless or wired signals 790. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile or non-volatile storage and retrieval device(s). Each input/output device 766 facilitates interaction with a user or other devices (network communications) in the network. Each input/output device 766 includes any suitable structure for providing information to or receiving/providing information from a user, including network interface communications.

Figure 8:
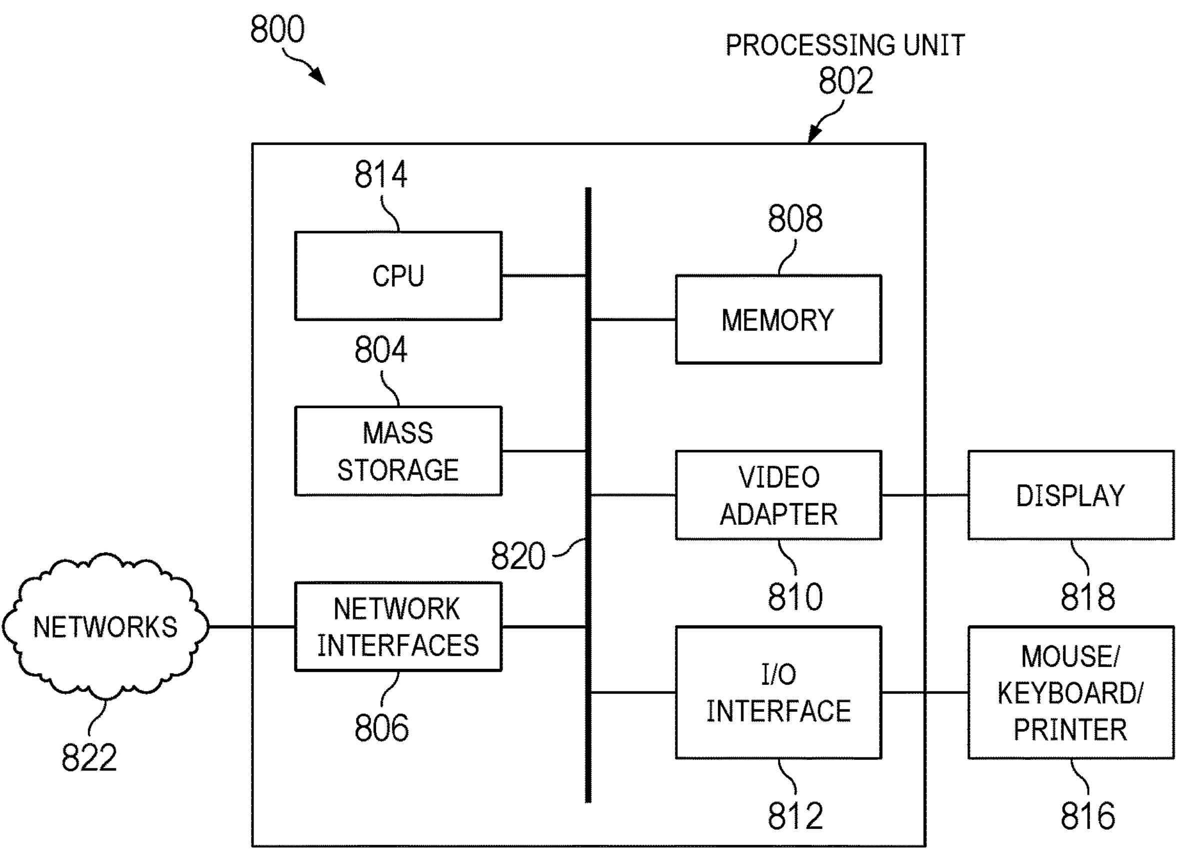
FIG. 8 is a block diagram of an embodiment computing system.

FIG. 8 is a block diagram of a computing system 800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 802. The processing unit includes a central processing unit (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs. The memory 808 may include instructions executable by the processing unit 802.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processing unit 802. As illustrated, examples of input and output devices include a display 818 coupled to the video adapter 810 and a mouse, keyboard, or printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for an external device.

The processing unit 802 also includes one or more network interfaces 806, which may comprise wired links, such as an Ethernet cable, or wireless links to access nodes or different networks. The network interfaces 806 allow the processing unit 802 to communicate with remote units via the networks. For example, the network interfaces 806 may provide wireless communication via one or more transmitters/transmit antennas and one or more receivers/receive antennas. In an embodiment, the processing unit 802 is coupled to a local-area network 822 or a wide-area network for data processing and communications with remote devices, such as other processing units, the Internet, or remote storage facilities.

In some embodiments, the computing system 800 may comprise an apparatus configured to implement the embodiments of the present disclosure. The processing units 802 may execute the instructions stored in the memory 808 to cause the apparatus to perform the embodiment methods of the present disclosure.

All or some of the foregoing embodiments may be implemented by software, hardware, firmware, or any combination thereof. When software is used for implementation, the embodiments may be implemented completely or partially in a form of a computer program product. The computer program product includes one or more computer instructions. When the computer program instruction is loaded and executed on a computer, all or some of the procedures or functions are generated according to the embodiments of the present disclosure. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable non-transitory media includes all types of computer readable media, including magnetic storage media, optical storage media, flash media or solid state storage media.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an obtaining unit/module, an priority updating unit/module, an indicating unit/module, a resource selecting unit/module, a resource pool partitioning unit/module, a re-evaluating unit/module, a pre-emption unit/module, a resource reserving unit/module, and/or a priority mapping unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:

transmitting, by a first device to a second device, a timing marker frame (TMF) in a first transmission cycle;

determining, by the first device, a transmission time of the TMF;

determining, by the first device, a time difference between the transmission time of the TMF and a start time of a second transmission cycle;

transmitting, by the first device to the second device, a phase offset message (POM) indicating the time difference; and transmitting, by the first device to the second device, frames in a transmission cycle subsequent to the first transmission cycle.

2. The method of claim 1, wherein the TMF indicates a TMF identifier (TMFID) that uniquely identifies the TMF, and wherein the POM indicates the TMFID.

3. The method of claim 1, wherein the transmission time of the TMF is a local time at which a first bit of the TMF is transmitted from a hardware of the first device.

4. The method of claim 1, the time difference is the transmission time of the TMF minus the start time of the second transmission cycle.

5. The method of claim 1, wherein the second transmission cycle is the same as the first transmission cycle, or wherein the second transmission cycle is after the first transmission cycle, or wherein the second transmission cycle is before the first transmission cycle.

6. The method of claim 1, wherein a transmission cycle length on the first device and a receive cycle length on the second device are the same.

7. The method of claim 1, wherein all the frames transmitted by the first device in a transmission cycle subsequent to the first transmission cycle are received by the second device in a same receive cycle without time synchronization between the first device and the second device.

8. The method of claim 1, wherein the TMF is not a first frame in time in the first transmission cycle transmitted by the first device.

9. The method of claim 1, wherein the first device transmits M TMFs in N transmission cycles, and wherein M is less than N.

10. A method comprising:

receiving, by a second device from a first device, a timing marker frame (TMF) in a first receive cycle;

receiving, by the second device from the first device, a phase offset message (POM) indicating a time difference;

determining, by the second device, a receive time of the TMF;

determining, by the second device, a start time of a second receive cycle based on the receive time of the TMF and the time difference indicated in the POM; and receiving, by the second device from the first device, frames in a receive cycle subsequent to the first receive cycle based on the start time of the second receive cycle.

11. The method of claim 10, wherein the TMF indicates a TMF identifier (TMFID) that uniquely identifies the TMF, and wherein the POM indicates the TMFID.

12. The method of claim 10, wherein the receive time of the TMF is a local time at which a first bit of the TMF is received by a hardware of the second device.

13. The method of claim 10, the time difference is the receive time of the TMF minus the start time of the second receive cycle.

14. The method of claim 10, wherein the second receive cycle is the same as the first receive cycle, or wherein the second receive cycle is after the first receive cycle, or wherein the second receive cycle is before the first receive cycle.

15. The method of claim 10, wherein a transmission cycle length on the first device and a receive cycle length on the second device are the same.

16. The method of claim 10, wherein all the frames transmitted by the first device in a transmission cycle subsequent to transmission of the TMF are received by the second device in a same receive cycle without time synchronization between the first device and the second device.

17. The method of claim 10, wherein the TMF is not a first frame in time in the first receive cycle received by the second device.

18. The method of claim 10, wherein the second device receives M TMFs in N receive cycles, and wherein M is less than N.

19. A first device comprising:

a non-transitory memory storage storing instructions; and one or more processors in communication with the non-transitory memory storage, wherein the instructions, when executed by the one or more processors, cause the first device to perform operations including:

transmitting, to a second device, a timing marker frame (TMF) in a first transmission cycle;

determining a transmission time of the TMF;

determining a time difference between the transmission time of the TMF and a start time of a second transmission cycle;

transmitting, to the second device, a phase offset message (POM) indicating the time difference; and transmitting, to the second device, frames in a transmission cycle subsequent to the first transmission cycle.

20. A second device comprising:

a non-transitory memory storage comprising instructions; and one or more processors in communication with the non-transitory memory storage, wherein the instructions, when executed by the one or more processors, cause the second device to perform operations including:

receiving, from a first device, a timing marker frame (TMF) in a first receive cycle;

receiving, from the first device, a phase offset message (POM) indicating a time difference;

determining a receive time of the TMF;

determining a start time of a second receive cycle based on the receive time of the TMF and the time difference indicated in the POM; and receiving, from the first device, frames in a receive cycle subsequent to the first receive cycle based on the start time of the second receive cycle.

* * * * *